D. SNITJER.
COMPENSATION JOURNALS FOR SEWING MACHINE BALANCE-WHEELS.

No. 170,122. Patented Nov. 16, 1875.

Attest.
Wm. P. Spalding
Edward Barthel

Inventor.
D. Snitjer
By Atty
Wm. S. Sprague

United States Patent Office.

DRIKUS SNITJER, OF QUINCY, ILLINOIS.

IMPROVEMENT IN COMPENSATION-JOURNALS FOR SEWING-MACHINE BALANCE-WHEELS.

Specification forming part of Letters Patent No. 170,122, dated November 16, 1875; application filed June 3, 1875.

*To all whom it may concern:*

Be it known that I, DRIKUS SNITJER, of Quincy, in the county of Adams and State of Illinois, have invented an Improvement in Compensation-Journals for Sewing-Machine Balance-Wheels, of which the following is a specification:

The nature of my invention relates to an improvement in compensation-journals for short bearings of that class wherein the wheel is carried on a fixed stud, and the wear is upon two cones on said stud, one at each end of the wheel-hub, one or both of which cones are adjustable to take up the wear.

The invention consists in slotting the outer and larger cone of the stud and tapping into its axis a taper-shank bolt for expanding the said cone, in combination with a cone sleeved on the stud at the back end of the hub.

Figure 1:
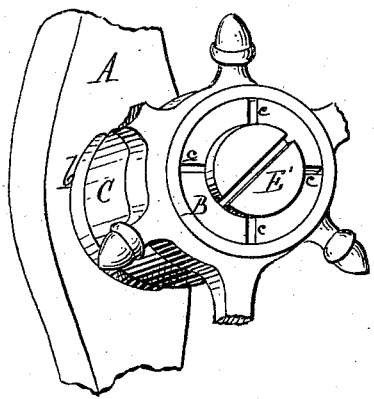
Figure 2:
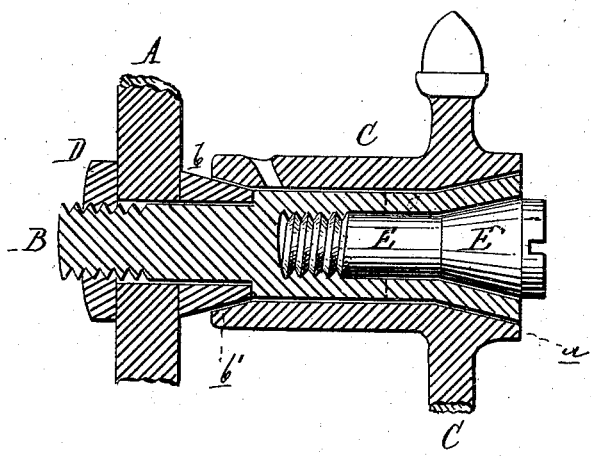

Figure 1 is a perspective view of the inner or free end of the hub of a sewing-machine driving-wheel mounted on my improved bearing. Fig. 2 is a longitudinal section of the same.

In the drawing, A represents a portion of the standard frame of a sewing-machine with a hole drilled through it to receive the threaded end of the stud B, which carries the balance-wheel C. The free end of the stud is made with a conical head or bearing, $a$, the base of the cone being at the extremity, while the axial hole of the hub is fitted thereto by a tapering counter-bore, $a'$. $b$ is a conical sleeve, which is slipped on the other end of the stud, which is turned down to a shoulder some little distance within the inner end of the hub, which end is counter-bored on a taper, $b'$, to correspond with the taper of the sleeve, the latter being interposed between the shoulder referred to and the frame A, to which it is secured by a clamping-nut, D, after which the bolt or stud and sleeve are left permanently in position.

It will be noticed that the diameter of the conical sleeve at the bearing-point is considerably less than the diameter of the bearing at the head of the stud.

It is found in practice that the larger one of two cones, or the greater circumference of a single cone, when used as a journal-bearing, will wear the most rapidly; hence the cone of the head of the stud will exhibit the greatest wear resultant from friction, more especially owing to the close proximity of the pitman. Therefore, I make no provision for taking up the wear by moving one or both cones laterally toward each other, as has heretofore been done; but I take up the wear by expanding the cone $a$ at the end of the stud B in the following manner: I drill a hole in the axis of the stud and screw, thread it to receive a bolt or screw, E, having a tapered shank, E', at the head, the end of the stud having a tapered counter-bore to receive it, and is also slotted, as at $c$, to permit of its expansion when said bolt E is screwed into the axis of the stud. The adjustment of the main bearing to take up wear is readily and easily effected by simply turning in the screw E without disturbing the stud or its fastenings from their original positions and adjustment.

I am aware that journal-bearings have before been constructed in sections and expanded by a conical screw for taking up the wear, and I do hereby disclaim the same; but—

What I claim as my invention is—

In a compensating-journal bearing for the balance-wheel of a sewing-machine, the conical bearing at the outer end of the stud, expansible by means of a tapered axial screw, and the conical sleeve combined with the conical bearings in the ends of the axis of the hub of the balance-wheel, substantially as described.

DRIKUS SNITJER.

Witnesses:
E. E. NEWTON,
WHITE JOHNSTON.